UNITED STATES PATENT OFFICE.

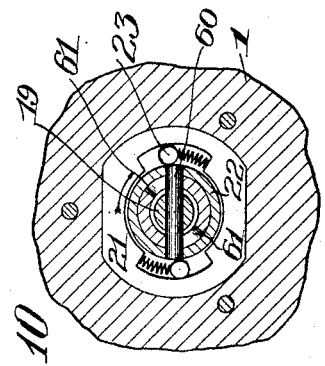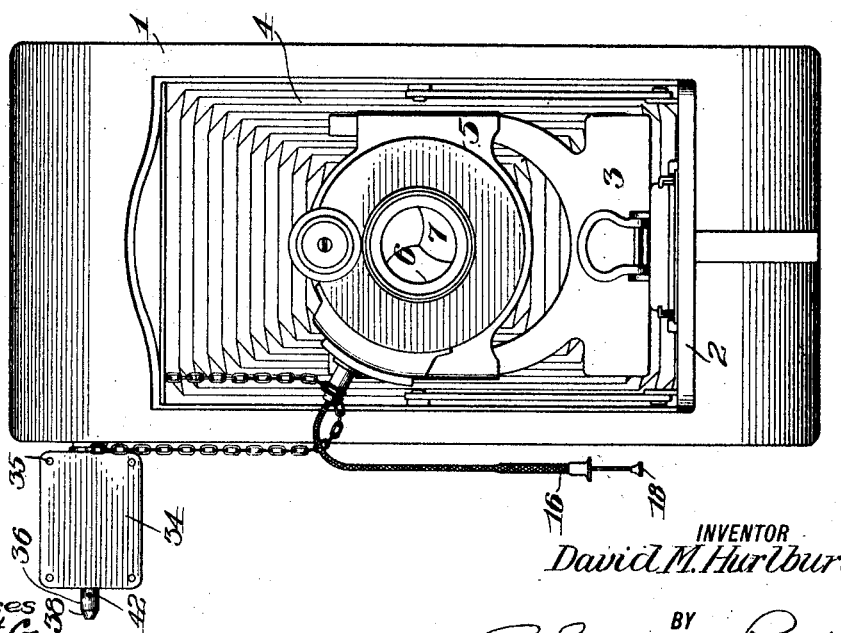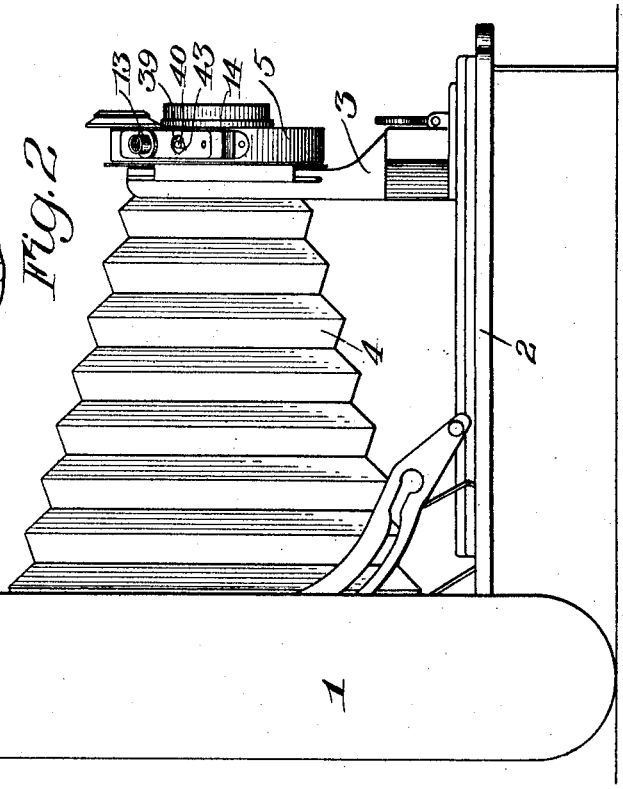

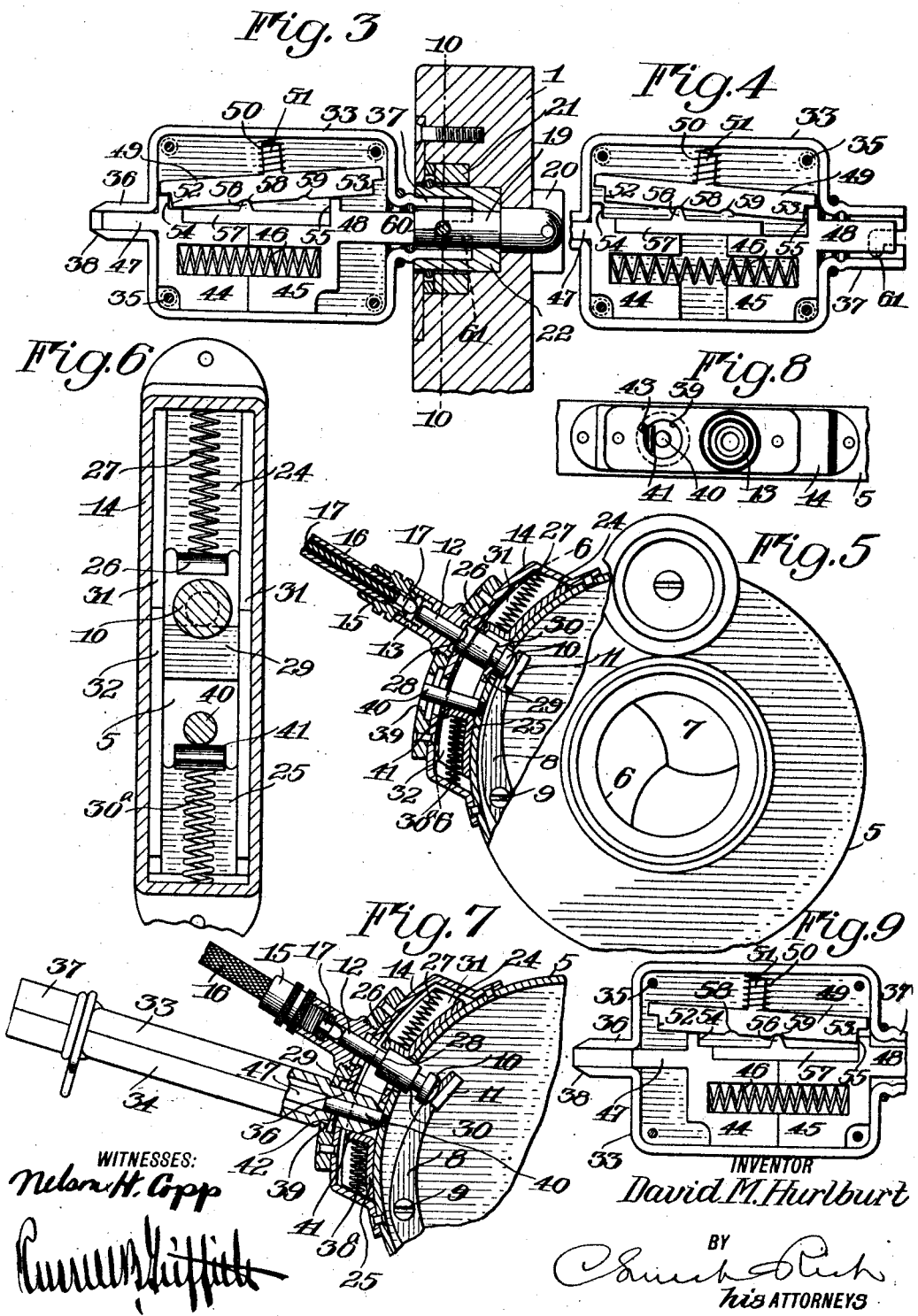

DAVID M. HURLBURT, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC EXPOSURE MECHANISM.

1,383,305. Specification of Letters Patent. Patented July 5, 1921.

Application filed May 5, 1917. Serial No. 166,571.

*To all whom it may concern:*

Be it known that I, DAVID M. HURLBURT, of Rochester, in the county of Monroe and State of New York, have invented certain new and useful Improvements in Photographic Exposure Mechanisms; and I do hereby declare the following to be a full, clear, and exact description of the same, reference being had to the accompanying drawings, forming a part of this specification, and to the reference-numerals marked thereon.

My present invention relates to photography and more particularly to photographic cameras in which successive picture areas of photographically sensitive material are carried into the focal plane, exposed and then carried off again, and the invention has for its object to make provision whereby an actuation of the shutter cannot be repeated until the sensitive material is shifted and the shifting of the sensitive material cannot be repeated until the shutter is again actuated whereby the double exposure of a picture area is prevented as is the passage of a picture area into and out of position for exposure without effecting the exposure thereof. The invention contemplates the use of a common controller for the shutter and the shifting mechanism for the sensitive material which can be used in connection with only one of these at a time and after such use, is prevented from being used again in the same capacity until used in its other capacity. Simplicity and durability in the structure of the parts are other objects of the invention and to these and other ends the invention resides in certain improvements and combinations of parts all as will be hereinafter more fully described, the novel features being pointed out in the claims at the end of the specification.

In the drawings:

Figure 1 is a front elevation of a camera provided with an exposure mechanism constructed in accordance with and illustrating one embodiment of my invention;

Fig. 2 is a side elevation thereof with the controlling key removed and also the shutter operating member;

Fig. 3 is an enlarged sectional view through the key and a portion of the film winding device of the camera;

Fig. 4 is a sectional view of the key corresponding to that of Fig. 3 but with the parts in a different position;

Fig. 5 is an enlarged sectional view through a portion of the camera shutter to illustrate the action of the shutter operating member, the remainder of the shutter being in elevation;

Fig. 6 is a further enlarged section taken substantially on the line 6—6 of Fig. 5;

Fig. 7 is a fragmentary view corresponding to the sectional portion of Fig. 5 but showing the parts in a different position and with the controlling key in coöperation therewith;

Fig. 8 is an enlarged detail plan view of the lock casing of the shutter;

Fig. 9 is a sectional view through the key member or controlling device corresponding to Fig. 4 but with the parts in another position, the barrel of the key at one end being broken away, and Fig. 10 is an enlarged detail sectional view through the back wind brake of the film winding device taken substantially on the line 10—10 of Fig. 3.

Similar reference numerals throughout the several views indicate the same parts.

In the present instance, I have illustrated my improvements as embodied in a familiar type of folding roll holding camera, the interior parts of which it has not been deemed necessary to show. In general, it comprises a body 1, bed 2, front 3, bellows 4 connecting the front and bed, and a shutter casing 5. The shutter aperture is indicated at 6 in Figs. 1 and 5 and is normally closed by the blades 7. The shutter operating member is a lever 8 pivoted at 9 and shown in the normal position in Fig. 5. When rocked to the position of Fig. 7, the blades are opened and the sensitive material in the body of the camera exposed. A plunger 10 guided in the shutter casing 5 bears against the face of an ear 11 on the operating member 8 to move it. The stem 12 of the plunger is guided in a nipple 13 threaded into the wall of a small casing 14 formed on the casing 5 and also threaded to receive the plug 15 of a familiar form of cable shutter release 16. The inner flexible member 17 of this cable release, when projected by means of a push button 18, projects the plunger 10 against the shutter operating member 8 to actuate the shutter.

The strip of film is wound through the focal plane of the camera between two spools in the usual manner and 19 indicates the winding stem or pin having a head 20 on the inside of the camera (Fig. 3) that coöperates with the winding spool. It is journaled in a socket 21 through the medium of a shell 22 in which it has endwise movement to engage and disengage the film spool and the shell 22 is allowed to turn in only one direction to prevent back wind by the usual ball clutch 23 shown in Fig. 10 between it and the socket 21.

Ordinarily, the camera shutter is made to operate at will independently of the film winding mechanism but in the practice of my invention, I provide, in the present embodiment, a lock for the shutter and a key for releasing it without which key the film winding devices cannot be operated so that it controls both of these elements and the key or controller is so influenced in each instance of such use that it cannot be again used on that element until it has been first used on the other element.

The locking device for the shutter comprises, in the present instance, a curved plate 24 that reciprocates slidably on the shutter casing 5 within the casing 14 on one side of the plunger 10 and a similar plate 25 on the other side. The plate 24 has an offset lip 26 that is urged by a spring 27 into a position to engage a shoulder 28 on the plunger 10 when the latter is thrust in to actuate the shutter operating member 8, as in Fig. 7, and the plate 25 has a lip 29 adapted to similarly engage beneath the shoulder 30 on the plunger 10 and prevent it from being thrust inwardly when the plunger is in the position of Fig. 5, the said plate 25 being thus operated by a spring 30$^a$. Except during the movement of the plunger 10, one or the other of these locking lips is always in operative position and while the lip 29 prevents movement of the plunger in both directions, the lip 26 prevents only the outward movement of the plunger. But the spring 30$^a$ of the locking plate 25 is stronger than the spring 27 of the locking plate 24 and the two plates have abutting side flanges 31 and 32 so that the plate 25 when in locking position, engages and overcomes the plate 24 though when relieved of the plate 25, the plate 24 and its lip 26 move into locking position under the pressure of their spring 27.

The normal position of the shutter and lock is shown in Fig. 5 the operating member 8 being provided with a spring not shown that returns the plunger 10 after each operation. It will be seen from this figure that the plate 25 is in locking engagement with the plunger 10 and the shutter is locked from the last previous exposure. To release it the key shown in Fig. 7 is applied, which key comprises, in the present instance, a halved rectangular casing formed of the two parts 33 and 34 secured together by pins or screws 35. At one end of the casing is a tubular barrel 36 and at the other end a larger tubular barrel 37. The barrel 36 has a cam faced end 38 and the said barrel is adapted to be inserted through an opening 39 in the lock casing 14 and over a pin 40 projecting therein from the shutter casing 5. When so inserted, the cam 38 engages an ear 41 on the locking plate 25 adjacent to the pin 40 and displaces the plate so that the locking lip 29 is withdrawn from the plunger 10. The plunger can now move against the shutter operating member 8 as shown in Fig. 7, to actuate the shutter but in so doing the locking plate 24 moves independently under its spring 27 into locking engagement with the shoulder 28 of the plunger, preventing it from returning and this also prevents the shutter from being reset so that another exposure cannot then be made while the key is in place. Neither can it be made when the key is withdrawn for thereupon the plate 25 with its stronger spring 30$^a$ displaces the plate 24 and itself goes into engagement with the plunger 10 locking it as before as soon as it returns under the influence of the shutter operating member 8 as the shutter is reset. The key is held in position on the shutter by a bayonet joint consisting of a pin 42 on the barrel 36 and a slot 43 for its entrance adjacent to the aperture 39.

Having now explained that the shutter cannot be again operated before the key is withdrawn nor immediately after it is withdrawn, I will explain a provision that prevents the key, once withdrawn, from being immediately reinserted to unlock the shutter and allow of its operation before a new area of film has been wound into the focal plane. Slidable within the key casing are two bolt plates 44 and 45 and an intermediate spring 46 acts upon both of them with a tendency to spread them apart and move them to opposite ends of the casing. When moved to its end of the casing, a plunger 47 on the plate 44 closes the interior of the barrel 36 while similarly, a plunger 48 on the bolt 45 can close the interior of the barrel 37. A rocking double latch 49 actuated by a spring 50 surrounding a lug 51 thereon has two engaging shoulders 52 and 53 adapted to respectively coöperate with shoulders 54 and 55 on the bolts 44 and 45, respectively. The latch is fulcrumed at 56 on a shifting fulcrum block 57 that slides on the bolts 44 and 45 jointly so that the fulcrum may have a bearing at 58 on one side of the spring center 51 or at 59 on the other side.

The key is inserted in the shutter as in Fig. 7 at a time when the latch mechanism of the key is in the position of Fig. 4. As a result of this insertion, the pin 40 displaces the plunger 47 moving the bolt 44 to the right and with it the fulcrum block 57 so that the fulcrum 56 is transferred from the latch bearing 58 to the latch bearing 59 as shown in Fig. 9. Therefore, when the key is withdrawn, the spring 50 rocks the latch to the left as the spring 46 throws the bolt 44 to the left and the shoulder 52 locks with the shoulder 54 to prevent the plunger 47 from being again displaced and the key cannot be again inserted because the said plunger prevents the entrance of the pin 40 to the barrel 36.

This locked condition of the key is relieved, however, when the key is used to turn the film winding mechanism which must be done before the shutter is unlocked and used again for the next exposure. To turn the film winding stem 19, the other barrel 37 of the key is inserted over the stem as shown in Fig. 3, a pin 60 on the latter coöperating with an L slot 61 in the barrel to provide a bayonet joint between the two that permits the key to be used to retract the stem when desired for the purpose of releasing the film spool in the usual manner. As the stem 19 enters the barrel 37, it displaces the plunger 48 as shown in Fig. 3 and shifts the fulcrum 56 back to the bearing 58 though the latch shoulder 52 still locks the bolt 44 and plunger 47 at 54. The winding having been completed and the key withdrawn, the latch is rocked to the right by its spring 50 as soon as the spring 46 returns the bolt 45 and plunger 48 and the position of Fig. 4 is reassumed ready for the use of the key on the shutter to permit another exposure as a new area of sensitive material has been drawn into the focal plane.

This release of the latch from the shutter plunger locks the winding plunger 48 in the barrel 37 against the reëntry of the stem 19 for another winding movement before an exposure is made by the engagement of shoulder 53 with shoulder 55 as shown in Fig. 4 and hence the film cannot be wound off before it is exposed. It is only when the key in the condition of Fig. 4 is inserted in the shutter with a consequent shifting of the fulcrum block and of the latch, as first above explained, that the bolt 45 and plunger 48 are released for the reëntry of the stem 19 for a further winding movement.

It will be observed that the operator is not required to carry in his mind the last use which he has made of the key. Either use to which he finds himself able to put it is the proper use and the one next in order. If he finds the shutter locked, he knows that the key will unlock it if the film has been wound and if he finds that it will not so unlock it, he knows that the film has not been wound and proceeds with the winding operation. Similarly, if he thinks the film should be wound and he cannot insert the key to wind it, he knows that the shutter is waiting to be operated and that that is the place to apply the key. In other words, the key will always fit in one of the positions if not both and its action immediately reveals the condition of the apparatus.

I claim as my invention:

1. In a photographic camera, the combination with means for shifting sensitive material in the focal plane of the camera and a shutter controlling mechanism, of a lock for the said mechanism and a removable key for sequentially operating the lock and the shifting means.

2. In a photographic camera, the combination with a film winding device, a shutter controlling mechanism and a lock for the latter, of a removable key adapted to be sequentially used either in turning the winding device or operating the lock.

3. In a photographic camera, the combination with means for shifting sensitive material in the focal plane of the camera, a shutter controlling mechanism and an automatic lock for the latter effective after each exposure, of a common means for sequentially and alternately operating the shifting means and releasing the shutter lock.

4. In a photographic camera, the combination with a film winding device, a shutter controlling mechanism and an automatic lock for the latter effective after each exposure, of a winding key for the film winding device adapted to be set for subsequent coöperation with the shutter lock when applied to the film winding device.

5. In a photographic camera, the combination with means for shifting sensitive material in the focal plane of the camera, a shutter controlling mechanism and an automatic lock for one of said elements effective after each exposure, of a key for alternately releasing the lock on one element and exerting control over the other and means on the key set by one of said operations and released by the other for preventing a repetition of its use in either operation.

6. In a photographic camera, the combination with means for shifting sensitive material in the focal plane of the camera after each exposure to displace the exposed photographic surface and substitute an unexposed one, and a shutter, of a key adapted to separately control the operation of both of said elements and coöperating devices on the key and on the respective elements for locking it against a repetition of its use to effect the operation of one until it has been used upon the other.

7. In a photographic camera, the combination with means for shifting sensitive material in the focal plane of the camera after each exposure to displace the exposed photographic surface and substitute an unexposed one, and a shutter, of a key adapted to separately control the operation of both of said elements and coöperating devices on the key and on the respective elements for locking it against a repetition of its use to effect the operation of one until it has been used upon the other, comprising pins on the said elements, plungers on the key displaced thereby and a latch adapted to lock one plunger until released by the displacement of the other plunger.

8. In a photographic camera, the combination with means for shifting sensitive material in the focal plane of the camera after each exposure to displace the exposed photographic surface and substitute an unexposed one, and a shutter, of a key adapted to separately control the operation of both of said elements and coöperating devices on the key and on the respective elements for locking it against a repetition of its use to effect the operation of one until it has been used upon the other, comprising pins on the said elements, spring plungers on the key displaced by the pins, a rocking latch for locking either plunger and a shifting fulcrum for reversing the latch actuated by the unlocked plunger.

9. In a photographic camera, the combination with a film winding device embodying a winding stem for shifting sensitive material in the focal plane of the camera after each exposure to displace the exposed photographic surface and substitute an unexposed one, and a shutter having a lock and a pin adjacent thereto, of a key comprising a casing and a barrel at each end thereof, one adapted to coöperate with and turn the stem of the winding device and the other adapted to engage over the pin on the shutter and release the lock, plungers in the respective barrels adapted to be displaced by the pin and stem, respectively, and a latch adapted to lock one plunger against displacement and to be released by the displacement of the other plunger.

DAVID M. HURLBURT.

Witnesses:
WILLIAM J. PARKINSON,
WILLIAM A. M. WELLES.